Jan. 31, 1967  E. N. BACON  3,301,686
METHOD OF MAKING FISH PRODUCT

Filed Feb. 24, 1964

INVENTOR
Ernest N. Bacon
BY James A. Lamb
PATENT AGENT

3,301,686
METHOD OF MAKING FISH PRODUCT
Ernest N. Bacon, Halifax, Nova Scotia, Canada, assignor to Nova Scotia Research Foundation, Nova Scotia, Canada
Filed Feb. 24, 1964, Ser. No. 346,645
4 Claims. (Cl. 99—111)

This invention relates to a fish product and to a process for making the same.

The present invention seeks to provide a novel fish product of distinctive form and taste. In one specific form of the invention, the product is in the nature of a thin, crisp, wafer composed of fish flesh and resembling a conventional potato chip but having a distinctive taste.

The present invention also seeks to provide a simple inexpensive process for treating fish flesh to produce a food product of highly palatable nature and nutritional value.

Figure 1:
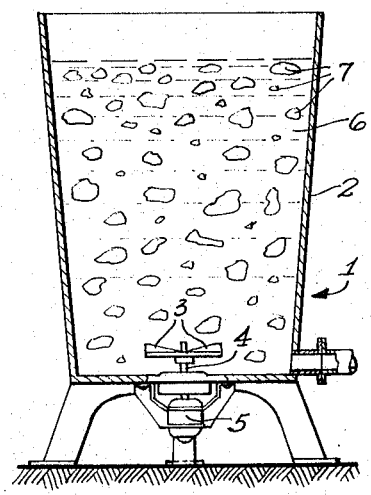
Figure 2:
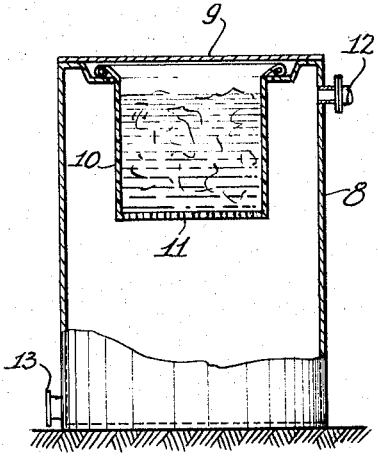
Figure 3:
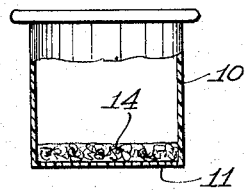
Figure 4:
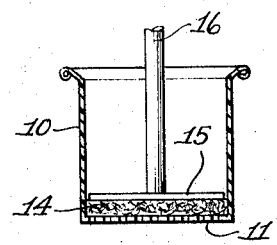

The invention will be described with reference to the accompanying drawing, in which FIGURE 1 is a side elevation of a fiberizing device,
FIGURE 2 is a side elevation of a screening device,
FIGURE 3 is a side elevation of a fish fiber receiving receptacle, and
FIGURE 4 is a side elevation showing a pressing means associated with the receptacle.

In accordance with the invention, any suitable type of fish is employed as the starting substance. The fish are first cleaned in conventional manner by removal of the heads and entrails. The skin, bones, and other residue may also be removed during the cleaning stage, but alternatively, this step may be omitted. The cleaned fish are then partially dried by exposing them to atmosphere for a period of time or by subjecting them to a short, mild heating step to dry the gel-like secretion therein.

The partially dried fish, preferably cut into lumps or chunks, are now subjected to a fiberizing treatment in water to produce an aqueous slurry of separated fish flesh fibers. Any suitable conventional hydropulper, beater or the like is employed. FIGURE 1 illustrates at 1 a suitable beating device comprising a vessel 2 containing a series of rotatable blades 3 mounted on a shaft 4 driven by a motor 5. The vessel is charged with a quantity of water 6 and the fish pieces of chunks 7. The charge comprises at least 90% water and 10% fish by weight. Preferably, the charge comprises approximately 98% water and 2% fish.

The beater is now driven for a period of time until the fibers of the fish are substantially completely separated from each other to produce a substantially homogeneous slurry of water and fish flesh fibers.

If the skins, bones, and other residue has not been preliminarily removed, the slurry is screened to remove this foreign matter from the fiber slurry.

The fiber slurry is now further screened to partially remove the moisture content thereof. This partial dewatering step may be effected in any suitable filter or screen device.

FIGURE 2 illustrates a suitable screening device comprising a closed tank 8 having suspended from the top 9 thereof a cylindrical receptacle 10 having a perforated or wire screen bottom 11. The screen bottom may be 40 mesh. The tank 8 is subjected to suction or vacuum through a line 12. A drain plug 13 is provided to remove the separated water.

The receptacle 10, having a moist mat 14 of interlocking fish flesh fibers therein is then removed from the tank, as shown in FIGURE 3.

If necessary to obtain further dewatering of the mat, a pressure plate 15 carried by a shank 16 may be employed to press the mat against the screen 11. Such a pressure plate may be employed during the vacuum screening step described.

It is important that the moisture content of the final mat be closely controlled to limit subsequent shrinkage and loss of fat therein. The moisture content of the mat should not be less than 25% and preferably in the approximate range of 40 to 50%.

The mat may have a thickness ranging from a few thousands of an inch to at least one inch depending upon the desired character of the final product. For instance, if a chip-like product is desired, the thickness may be a few thousands, say, five thousands, of an inch.

The mat is now cooked in any desirable manner. For instance, it may be passed as a sheet between heated rolls and the cooked sheet then broken up randomly. Alternatively, it may be cut into any desired shape and the cut shapes fried to the proper degree of crispness in a deep fat of appropriate temperature.

It will be apparent that seasonings or flavorings may be added to the mat before cooking to modify the taste and added to the palatability of the final product. Other addition to the fish fiber may include flour, corn starch or ground cracker crumbs.

The fish employed may be partially dried fresh fish or conventional forms of salt or dried fish.

While the invention as thus far described contemplates the production of crisp or soft patties of varying thickness and fish cakes, it will be apparent that the final product may be in the form of a loose mixture of fibers that might be sprinkled on other foods to render such foods more savory.

In respect of the fish chips, patties or cakes produced in accordance with the invention, it will be apparent that no binder is required since a coherent mass is formed by random mechanical interlocking of the fibers plus added adhesion caused by surface tension of the initially moist fibers. Furthermore, the pressure exerted by the pressure plate and/or the force exerted during the vacuum screening contributes significantly to the strength of the sheet.

It will be apparent that the final product of the invention may comprise simply the uncooked mat, sheet or body of fish flesh fibers. Such an uncooked body of fibers may be canned or stored in frozen or unfrozen state for later cooking as required.

I claim:
1. A process of making a fish product which comprises
  (a) forming a body consisting essentially of not more than 10% of raw fish and not less than 90% water,
  (b) beating said body to separate substantially completely the fibers of said fish and to produce a substantially homogeneous aqueous suspension of randomly arranged fish flesh fibers,
  (c) removing water from said suspension to produce a mat of randomly interlocked fish flesh fibers containing at least 25% water,

(d) storing said mat until subjected to a cooking step, and
(e) maintaining said moisture content of 25% in said mat during said entire storing step to limit shrinkage and loss of fat therein during said cooking step.

2. A process of making a fish product as defined in claim 1, wherein said fish flesh comprises not more than approximately 5% by weight of said mixture.

3. A process of making a fish product as defined in claim 1, wherein said fish flesh comprises approximately 2% by weight of said mixture.

4. A process of making a fish product as defined in claim 1, said partially dewatered slurry containing approximately 40 to 50% water.

References Cited by the Examiner

UNITED STATES PATENTS

| 3,099,562 | 7/1963 | Rogers | 99—18 |
|---|---|---|---|
| 3,114,639 | 12/1963 | Rivoche | 99—209 X |

FOREIGN PATENTS 669,597　4/1952　Great Britain.

A. LOUIS MONACELL, *Primary Examiner.*

L. M. SHAPIRO, *Assistant Examiner.*